Oct. 23, 1962 V. C. RIDEOUT 3,060,421
MICROWAVE GAUGE
Filed Sept. 22, 1960
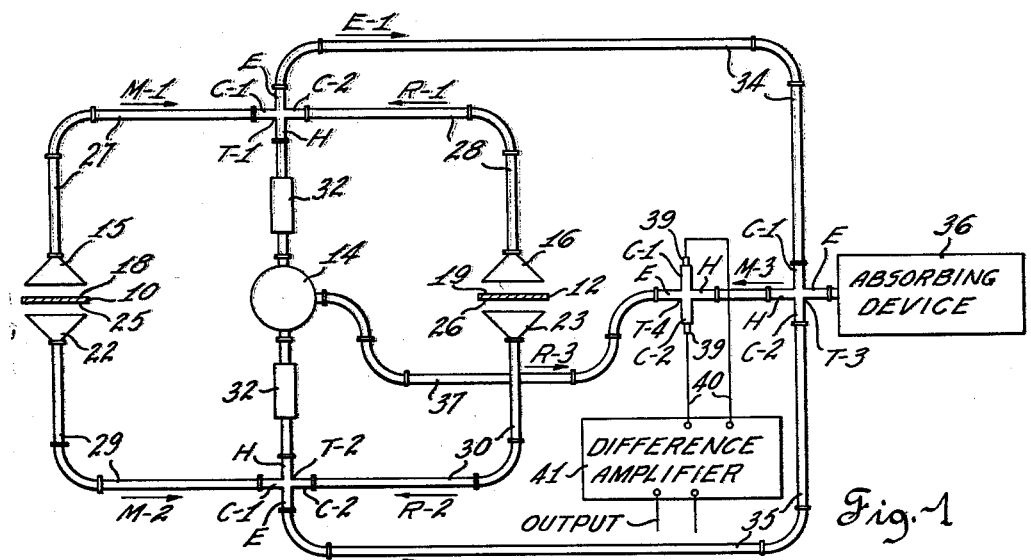
Fig. 1
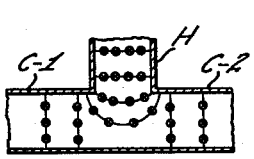
Fig. 2
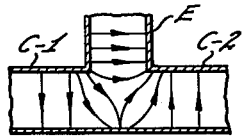
Fig. 3
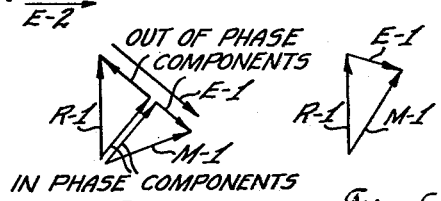
Fig. 4
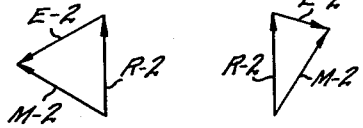
Fig. 5
Fig. 6
Fig. 7
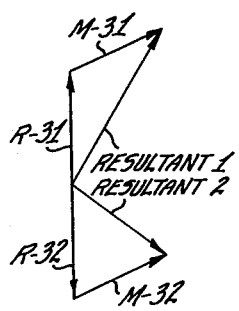
Fig. 8
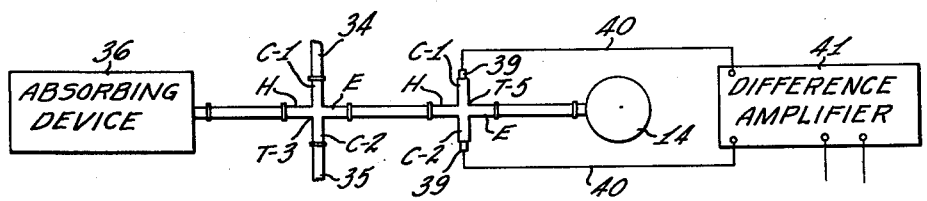
Fig. 9
Inventor
Vincent C. Rideout
By W. J. Robertson
Attorney 3,060,421
MICROWAVE GAUGE
Vincent C. Rideout, Madison, Wis., assignor to Allis-Chalmers Manufacturing Company, Milwaukee, Wis.
Filed Sept. 22, 1960, Ser. No. 57,760
15 Claims. (Cl. 343—5)

This invention relates to measuring devices. More specifically this invention relates to a gauge that uses microwaves to measure variations in the distance between two wave reflecting surfaces. The gauge also measures variations in the position of a center plane between the two wave reflecting surfaces.

An example of a specific system using this gauge will help to explain the gauge itself. The gauge is particularly useful in measuring the thickness of a sheet of metal in a rolling mill. The gauge detects the error in the thickness of the sheet and signals a control system that adjusts the mill to correct the error. Modern developments in mill controls have greatly increased the problems of providing a suitable thickness gauge. Many mills now use an X-ray thickness gauge that measures the thickness of a sheet of metal indirectly by measuring the X-ray radiation that penetrates the sheet. The impurities in some metals are distributed nonuniformly and produce variations in the density of the material that appear to the X-ray gauge as variations in thickness. This problem occurs particularly in thin sheets of aluminum which contain small amounts of copper.

In the March 1960 issue of "The Review of Scientific Instruments" Professor Harold A. Peterson of the University of Wisconsin has described a thickness gauge that reflects microwaves from the surfaces of a sheet to measure the sheet thickness. Microwaves are not appreciably affected by differences in the composition of the material or by surface conditions of the material, and microwave gauges are highly promising as thickness gauges in rolling mills and in other applications.

The wave length of a microwave is ordinarily an appreciable fraction of the distance that the wave travels in the transmission lines and other components of a microwave system. Consequently, the magnitude of a microwave varies sinusoidally with distance in addition to varying with time as in the more familiar low frequency circuits. Thus, the distance between two reference points in a microwave transmission system can be described by the number of wave lengths between the points or by the angular distance between the points as well as by the usual units of distance. Variations in the distance which are small relative to a wave length can be described by a corresponding change in the phase difference of the wave at the two points without regard to the actual number of wave lengths between the points.

In the thickness gauge of this invention each surface of a reflecting sheet acts as a reference point that varies as the thickness of the sheet varies. Thus, as the thickness of the material changes, the phase of waves that are reflected from the opposite surfaces of the sheet change at a fixed reference point. From the preliminary discussion of microwaves it might appear that the gauge would simply compare the phase of the wave that is reflected from one side of the sheet with the phase of the wave from the other side. However, the distance between a surface of the sheet and its associated fixed reference point varies with changes in position of the sheet as well as with changes in thickness. Thus, the reflected waves contain information about the position of the sheet as well as information about the thickness of the sheet. The thickness gauge operates on the reflected waves to sort out the position information from the thickness information and to indicate the magnitude of an error in the thickness of the material and whether the error is in the thick or thin direction.

The gauge first compares the phase of each of the two reflected waves with two reference waves and produces two outputs that each contain position information and thickness information for one side of the sheet. The gauge compares the two outputs and segregates the components that indicate the direction and magnitude of the error from the components that contain position information. The gauge compares the direction and magnitude components with a third reference wave to indicate the error magnitude by means of a voltage magnitude and to indicate the error direction by means of the polarity of the voltage.

A more specific feature of this invention is that the two reference microwaves for determining the combined position and thickness information for each side of the sheet are reflected from fixed reference surfaces of a sheet of material that is of the thickness that is desired in the measured sheet. This feature is important in the practical design of a mill control because it greatly simplifies setting up the control to produce various differing reductions in the material. In addition the waves that are reflected from the measured sheet and from the reference sheet can be compared in terms of their in-phase and out-of-phase components by means of simple microwave hybrid junctions to determine the magnitude and direction of the error.

In addition the gauge with a simple modification produces position information. This information can be useful in connection with the thickness information, or it can be used separately, for example, to measure vibration.

One object of this invention is to provide a new and improved thickness gauge.

Another object of this invention is to provide a new and improved thickness gauge that uses microwaves.

Another object of this invention is to provide a new and improved thickness gauge that measures the distance between reflecting surfaces and is not influenced by the internal composition of the material.

Another object of this invention is to provide a new and improved gauge that indicates the magnitude and direction of an error in thickness as the magnitude and polarity of an electrical output.

Another object of this invention is to provide a new and improved microwave thickness gauge in which the thickness of a measured sheet is compared with the thickness of reference sheets that can be simply and easily interchanged.

Another object of this invention is to provide a new and improved gauge for detecting changes in position of an object without regard to changes in the thickness of the object.

Other objects and advantages will appear from the drawing and the specification as the gauge is described.

In the drawing FIG. 1 is a schematic diagram of the microwave thickness gauge of this invention;

FIGS. 2 and 3 illustrate some of the characteristics of a microwave hybrid junction as it is used in the gauge of FIG. 1;

FIGS. 4, 5, 6, 7 and 8 are vector diagrams that illustrate the phase relationship between microwaves in the gauge; and FIG. 9 shows part of the thickness gauge of FIG. 1 that is modified to indicate changes in position of a test subject.

The gauge that is shown in FIG. 1 compares the thickness of a measured sheet 10 with the thickness of a reference sheet 12 by means of microwave energy that is produced by a suitable oscillator 14. A first measuring antenna 15 and a first referencing antenna 16 are positioned on corresponding sides 18, 19 of the two sheets 10, 12 and are suitably coupled to the oscillator 14 to illuminate these sides with microwave energy. An antenna that is suitable for the gauge is described by Ryan and Summers in the article "Microwaves Used To Observe Commutator and Slip Ring Surfaces During Operation" in the March 1954 issue of Electrical Engineering. Similarly, a second measuring antenna 22 and a second referencing antenna 23 are suitably coupled to the oscillator 14 and are positioned to illuminate the other sides 25, 26 of the two sheets. One of the measuring antennas 15 and the corresponding referencing antenna 16 are coupled to the oscillator by a microwave hybrid junction T-1 and suitable wave guides 27, 28. The other measuring antenna 22 and the other referencing antenna 23 are similarly coupled to the oscillator by a hybrid junction T-2 and associated wave guides 29, 30.

The sheet 10 is positioned between the antennas 15, 22 by any suitable means, for example, by work rolls in a rolling mill. Usually the sheet 10 is not held stationary between the antennas 15, 22 but varies in position between the antennas as the sheet moves through the mill.

The antennas that illuminate the strip surfaces also receive a portion of the reflected waves and couple these waves to the wave guides and the hybrid junctions. The hybrid junctions T-1 and T-2 may be considered as fixed reference points in relation to the surfaces 18, 19, 25, 26 of the two sheets. Since the measuring waves and the referencing waves originate from a common oscillator, their phase relationship at the reference points depends on the distances between the reference points, and likewise changes in the phase relationship indicate changes in the distance.

FIGS. 2 and 3 show some of the characteristics of one hybrid junction, the hybrid T. As is conventional, arrows directed into the paper represent the E-field in FIG. 2, and arrows in the plane of the paper represent the E-field in FIG. 3. FIGS. 2 and 3 are similar to drawings on page 260 of the book "Microwave Mixers" by Robert V. Pound, McGraw-Hill Book Co., Inc. which contains further information about the hybrid T and equivalent devices. The hybrid T is in some respects a combination of an H-plane T and an E-plane T. It has two colinear arms C-1 and C-2, an E-plane arm that is orthogonal to the colinear arms and an H-plane arm that is orthogonal to the other arms.

FIG. 2 is in the H-plane of a hybrid T and shows the relationship between the H-arm and the two colinear arms C-1 and C-2. A microwave that is fed into the hybrid junction through the H-arm excites a wave in each of the two colinear arms. The waves in the two colinear arms are in phase, that is, the two waves have the same phase at planes equal distances from the plane of symmetry of the T. The wave pattern of FIG. 2 also exists when two in-phase waves enter the hybrid junction through the two colinear arms and excite a wave in H-arm. In either situation just described, none of the energy enters the E-arm. FIG. 2 illustrates the operation of the hybrid junctions T-1 and T-2 on the wave that is supplied by the oscillator 14 and on the in-phase components of the reflected waves.

FIG. 3 is in the E-plane of a hybrid T and shows the relationship between the E-arm and the two colinear arms C-1 and C-2. A microwave that is fed into the hybrid junction through the E-arm excites a wave in each of the colinear arms, and the waves in the colinear arms are out of phase. Similarly, two out-of-phase waves that are fed into the hybrid junction through the two colinear arms excite a wave in the E-arm. In either situation, none of the energy enters the H-arm. FIG. 3 describes the operation of the hybrid junction T-1 and the hybrid junction T-2 on the out-of-phase components of the reflected measuring waves and the referencing waves.

The gauge is set up, as will be explained later, so that all four waves are in phase when the measured sheet 10 is centered between the measuring antennas 18, 25, and the measured sheet and the reference sheet are the same thickness. As FIGS. 4, 5, 6 and 7 show, the reference waves and the measuring waves have the same magnitude. The symmetry of the referencing and the measuring components of the gauge is an advantage in producing waves of equal magnitude.

When the upper surface 18 of the measured sheet 10 moves away from the upper measuring antenna 15 for some reason (either a change of position or a change of thickness or both), the distance between the surface 18 and the hybrid junction T-1 increases, and the number of wave lengths and the angular distance also increase between these reference points. As FIG. 4 represents this condition, the vector M-1 that represents the phase and magnitude of the measuring wave is rotated slightly clockwise of the vector R-1 that represents the referencing wave. As FIG. 4 shows, the two vectors M-1 and R-1 can be resolved into in-phase components and out-of-phase components. When the distance between the hybrid junction T-1 and the surface 18 of the measured sheet 10 increases, the measuring vector M-1 rotates farther clockwise from the referencing vector R-1 and thereby increases the out-of-phase components and decreases the in-phase components of the two waves. Thus, both the in-phase and the out-of-phase components of the measuring wave and referencing wave contain information about the position and the thickness of the measured sheet.

The hybrid junction T-1 separates the in-phase components and the out-of-phase components of the reflected waves as FIGS. 2 and 3 show. The in-phase components of the two waves excite a wave in the H-arm of the mixer T-1 as FIG. 2 shows, and an isolator 32 between the oscillator and the hybrid junction T-1 absorbs these components of the two waves. The isolator 32 prevents the reflected waves from influencing the oscillator and from entering the wave guide 37 that will be described later. The out-of-phase components excite a wave E-1 in the E-arm, and other elements of the gauge further operate on the out-of-phase components of the two waves to measure the thickness of the measured sheet 10. As FIG. 4 shows, the out-of-phase components combine in the E-arm to produce a wave that is similar in phase and magnitude to the difference between the waves R-1 and M-1. In FIGS. 5, 6 and 7 the E-arm outputs are shown without the components as they are shown in FIG. 4.

It will further simplify the description of the gauge to consider that the thickness of the material has not changed in the situation that FIG. 4 represents, but that the measured sheet 10 has moved off center between the two antennas 15, 22. Thus, the increase in distance between the hybrid junction T-1 and the upper surface 18 of the measured sheet is exactly equal to a decrease in distance between the hybrid junction T-2 and the lower surface 25 of the measured sheet 10. The position of the surface 25 of the measured sheet 10 is indicated in FIG. 5 by the position of the measuring vector M-2 which is counterclockwise of the reference vector R-2 by the same amount as the measuring wave M-1 in FIG. 4 is clockwise of the referencing wave R-1.

In the special case in which the measured sheet 10 is the same thickness as the reference sheet but is not centered between the measuring antennas 15, 22, the E-output, E-1, of the hybrid junction T-1 is identical in magnitude and is very nearly opposite in phase to the E-output, E-2, of the hybrid junction T-2. As will become apparent, for the more general case, the E-outputs, E-1 and E-2, of the hybrid junctions T-1 and T-2 can be analyzed in terms of the special case just described in which there is a position change only and the special case of a thickness change only. As FIGS. 4 and 5 show a change in the position of the measured sheet 10 is indicated by the out-of-phase components of the E-output of the hybrid junctions T-1 and T-2.

If the measured sheet 10 is centered between the measuring antennas 15, 22 but changes in thickness, the distance between the hybrid junctions T-1 and T-2 and the measured sheet will either increase equally (thinner) or decrease equally (thicker). FIGS. 6 and 7 represent an increase in the thickness of the material by rotating the measuring vectors M–1 and M–2 equally clockwise from the reference vectors R–1 and R–2. The E-output, E–1, of the hybrid junction T–1 is identical in phase and magnitude to the E-output, E–2 of the hybrid junction T–2. Thus, a change in thickness of the material is represented by the components of the E-output of the hybrid junctions T–1 and T–2 that are in phase.

The hybrid junction T–3 compares the E-outputs, E–1 and E–2, of the hybrid junctions T–1 and T–2. The colinear arms of the hybrid junction T–3 are coupled to the E-arms of the hybrid junctions T–1, T–2 by suitable wave guides 34, 35. The out-of-phase components of the two outputs, E–1 and E–2, which represent a change in position, excite a wave in the E-arm of T–3 as FIG. 3 illustrates. A suitable absorbing device 36 is coupled to the E-arm of T–3 to absorb this wave. The in-phase components, which indicate a change in thickness, excite a wave in the H-arm of T–3.

FIGS. 6 and 7 show that the in-phase components of the E-outputs, E–1 and E–2, of the hybrid junctions T–1 and T–2 vary in magnitude as the thickness of the measured sheet 10 changes. The phase of the outputs E–1 and E–2 also changes as the thickness of the measured sheet 10 changes. When the measured sheet 10 is thicker than the reference sheet 12, the measuring vectors M–1 and M–2 are clockwise from the referencing vectors R–1, R–2, and the outputs E–1 and E–2 are nearly at right angles to the referencing vectors R–1 and R–2 in the clockwise direction as in FIGS. 6 and 7. When the two sheets 10, 12 are the same thickness, R–1, R–2, M–1 and M–2 are all in phase and both E–1 and E–2 are zero. When the measured sheet 10 is thinner than the reference sheet 12, the measuring vectors M–1 and M–2 lie counterclockwise from the referencing vectors R–1 and R–2, and the outputs E–1 and E–2 are nearly at right angles to referencing vectors R–1, R–2 in the counterclockwise direction (a mirror image of FIGS. 6 and 7). Thus, the phase of the outputs E–1 and E–2 fall within two narrow ranges that are 180 degrees apart. As will be described later, the gauge indicates whether the measured sheet 10 is thicker or thinner than the reference sheet 12 from the phase of the outputs E–1 and E–2.

For some purposes it is sufficient to know only the magnitude of the error in thickness without knowing the direction of the error. The magnitude of the H-output of the hybrid junction T–3 can be detected by means of a crystal to indicate the magnitude of the error as will be apparent when the hybrid junction T–4 is explained. However, for many purposes it is highly desirable that the output of the gauge be zero when the error is zero and that the polarity of the output correspond to the direction of the error. The hybrid junction T–4 further operates on the H-output of the hybrid junction T–3 to obtain this information.

The hybrid junction T–4 compares the H-output of the hybrid junction T–3, M–3, with a third reference wave, R–3, that is produced by the oscillator 14. The third reference wave is fed into the hybrid junction T–4 through a wave guide 37 and one of the noncolinear arms, and it excites waves R–31 and R–32 in the two colinear arms. The H-output of the hybrid junction T–3, which is a measure of the error in thickness, is fed into the other noncolinear arm of the hybrid junction T–4 and excites waves M–31 and M–32 in the two colinear arms. In the specific gauge that is shown in FIG. 1, the oscillator 14 is coupled to the E-arm of the hybrid junction T–4 and the hybrid junction T–3 is coupled to the H-arm of the hybrid junction T–4. As FIG. 8 shows, the reference waves R–31, R–32 in the two colinear arms are out of phase and the waves M–31 and M–32 that are supplied from the hybrid junction T–3 are in phase in each of the two colinear arms. A crystal detector 39 is mounted in each of the colinear arms C–1, C–2 to detect the resultant waves. As FIG. 8 shows, the difference between the two resultant waves varies with the magnitude and the phase of the wave that is supplied from the hybrid junction T–3. In addition the polarity of the difference of the two resultants 1 and 2 depends on the phase of the wave that the hybrid junction T–3 supplies. This phase varies by nearly 180 degrees as the measured sheet 10 is thicker or thinner than the reference sheet 12, as has already been described. When the measured sheet 10 is thicker than the reference sheet 12, the vectors R–31 and M–31 form an obtuse angle, the vectors R–32 and M–32 form an acute angle, and the resultant 1 is larger than the resultant 2. Similarly, when the measured sheet 10 is thinner than the reference sheet 12, the other resultant, 2, is the larger. The phase of the reference waves R–31, R–32 at the hybrid junction T–4 depend on the length of the wave guide 37. The length of the wave guide 37 can be adjusted to provide the proper phase relationship between the waves R–31, R–32 and M–31, M–32.

The two crystals 39 each produce an electrical signal that is proportional to the corresponding resultant. Suitable conductors 40 couple the output of the two crystals 39 to a difference amplifier 41. The magnitude of the output of difference amplifier indicates the magnitude of the error in thickness and the polarity of the output indicates whether the measured sheet 10 is thicker or thinner than the reference sheet 12.

As the gauge has been described, the reference waves and the measuring waves are in phase when the measured sheet 10 is centered between the antennas 15, 22 and is of the same thickness as the reference sheet 12. The length of the wave guides and the position of the antennas can be chosen to provide the desired phase relationships at the hybrid junctions. Trimming screws may be mounted in the wave guides to make final adjustments in the effective length of the wave guides. To set up the gauge it is only necessary to position two sheets of equal thickness between the two pairs of antennas 15, 22 and 16, 23 and then to adjust the trimming screws until the output of the difference amplifier is zero. It is not necessary that the measured sheet be centered between the measuring antennas 15, 22 for setting up the gauge, but it may be desirable to position the measured sheet near its usual operating position so that excursions of the sheet will not take it into the region where the resulting in-phase output of the hybrid junctions T–1 and T–2 might be significant.

The wave that is excited in the E-arm of the hybrid junction T–3 contains position information that can be useful either independently or with the thickness information that appears at the output of the difference amplifier 41. For example, the position information might be used to modify the thickness output of the gauge of FIG. 1 to correct for errors that appear in the output because the outputs E–1 and E–2 are not exactly out of phase (compare FIGS. 4 and 5) as can be assumed for a small range of position. The position information alone is also useful, for example, to measure vibration.

As in detecting the thickness information in the H-output of the hybrid junction T–3, the E-output of the hybrid junction T–3 can be measured by means of a crystal. Such a detector indicates the distance but not the direction of the measured sheet 10 from a reference. The E-output of the hybrid junction T–3 can also be compared with a reference wave to obtain both distance and direction information.

FIG. 9 shows a detector for the E-output of the hybrid junction T–3 that is very much like the hybrid junction T–4 and the associated components in FIG. 1. FIG. 9 can be understood by analogy to the hybrid junction T–4 of FIG. 1 and the vector diagram of FIG. 8. The E-output of the hybrid junction T–3, i.e., the outputs E–1 and E–2 in FIGS. 4 and 5, enters a hybrid junction T–5 through the H-arm and excites waves in each of the colinear arms. These waves are in phase as are the waves M-31, M-32 in FIG. 8. The oscillator 14 supplies a reference wave to the hybrid junction T-5 through the E-arm and excites waves in the colinear arms which are out of phase as are the waves R-31 and R-32 in FIG. 8. The resultants of the waves in the colinear arms vary in these relative magnitudes with the phase of the H-output of the hybrid junction T-3. A crystal 39 mounted in each of the colinear arms and a difference amplifier 41 convert the magnitude of the two resultants to a signal that varies in magnitude according to the distance of the measured sheet 10 from a reference position. The polarity of this signal indicates that the measured sheet 10 is on one side or the other of the reference position.

Numerous applications of this gauge to an automatic gauge control for a rolling mill or to other systems that require position or thickness information will occur to those skilled in these arts.

This microwave gauge has been described in terms of two specific embodiments, and various microwave techniques may be substituted for the specific features described. For example, in some situations it may be satisfactory to position a wave reflecting surface a suitable distance from each of the arms C-2 of the hybrid junctions T-1 and T-2 in place of the referencing antennas and the reference sheet. Those skilled in the art will recognize other changes in the embodiments that have been described.

Having now particularly described and ascertained the nature of my said invention and the manner in which it is to be performed, I declare that what I claim is:

1. In a microwave gauge: first and second antennas positioned to each receive a measuring wave reflected from two surfaces of a measured subject, first means for comparing each of said measuring waves with a reference wave in terms of the in-phase components and the out-of-phase components of the compared waves, to produce output waves containing information about the positions of said surfaces with respect to said comparing means, and second means comparing said outputs in terms of their in-phase and their out-of-phase components to separate subject thickness information contained in said outputs from subject position information.

2. In a microwave gauge: a source of microwave energy, means cooperating with said source to illuminate two wave reflecting surfaces of a measured subject with microwave energy and to receive waves reflected from said surfaces, means cooperating with said source to produce reference waves for each of said reflected waves, means defining reference points in said gauge with respect to each of said surfaces and combining each of said reflected waves with one of said reference waves and producing two output waves indicating variations in the distance between each of said surfaces and said reference points, and means combining said distance indicating outputs and separating components of said outputs which are equal in distance and opposite in direction from components of said outputs which are equal in distance and in the same direction.

3. In a microwave gauge: oscillator means supplying microwave energy to illuminate two wave reflecting surfaces of a test subject, first and second antennas positioned to each receive a measuring wave reflected from one of said surfaces, means cooperating with said oscillator means to produce first and second reference microwaves, first comparing means for comparing each of said measuring waves with one of said reference waves in terms of the in-phase components and the out-of-phase components of said waves, said first comparing means producing output waves containing information about the distance between each of said surfaces and fixed reference points in said gauge, and second comparing means comparing said output waves in terms of their in-phase and their out-of-phase components to separate sheet thickness information contained in said outputs from sheet position information and means for converting at least one of said separated waves to an electrical signal.

4. In a microwave thickness gauge for comparing the thickness of a measured sheet of material with the thickness of a reference sheet of material, a source of microwave energy, a plurality of antennas adapted to illuminate opposite sides of said sheets with microwave energy from said oscillator and to receive first and second measuring waves reflected from said opposite sides of said measured sheet and first and second referencing waves from said opposite sides of said reference sheet, first means comparing said first waves and producing a first output wave comprising the out-of-phase components of said first waves and a second output comprising the in-phase components of said first waves, second means comparing said second waves and producing a first output wave comprising the out-of-phase components of said second waves and a second output comprising the in-phase components of said second waves; means comparing one of said outputs of said first means with the corresponding output of said second means and producing a third output wave comprising the in-phase components of said compared outputs, and means converting said third output wave to a signal indicating the relative thickness of said sheets.

5. A microwave thickness gauge for comparing the thickness of a measured sheet with the thickness of a reference sheet comprising a source of microwave energy, first and second pairs of antennas positioned for radiating energy from said source to first and second surfaces of said measured sheet and said reference sheet and for receiving energy reflected from said surfaces, a first hybrid junction coupling said source to said first pair of antennas and producing a first output wave comprising the out-of-phase components of waves reflected from said first surfaces and a second output wave comprising the in-phase components of waves reflected from said first surfaces, a second hybrid junction coupling said source to said second pair of antennas and producing a first output wave comprising the out-of-phase components of the waves reflected from said second surfaces and a second output wave comprising the in-phase components of waves reflected from said second surfaces, means receiving one of said output waves of said first hybrid junction and the corresponding output of said second hybrid junction and separating the in-phase and the out-of-phase components of said received outputs, and means producing an electrical signal proportional to at least one of said separated components to indicate the thickness of said measured sheet.

6. A microwave thickness gauge for comparing the thickness of a measured sheet with the thickness of a reference sheet comprising a source of microwave energy, first and second pairs of antennas positioned for radiating energy from said oscillator to first and second surfaces of said measured sheet and said reference sheet and for receiving energy reflected from said surfaces, a first hybrid junction coupling said source to said first pair of antennas and producing a first output wave comprising the out-of-phase components of waves reflected from said first surfaces, and a second output wave comprising the in-phase components of waves reflected from said first surfaces, a second hybrid junction coupling said source to said second pair of antennas and producing a first output wave comprising the out-of-phase components of the waves reflected from said second surfaces and a second output wave comprising the in-phase components of waves reflected from said second surfaces, means isolating one of said outputs of said first hybrid junction and the corresponding output of said second hybrid junction from said source, and means producing an electrical signal proportional in magnitude to the phase difference between the other of said outputs and a reference wave to indicate the thickness of said measured sheet.

7. In a microwave thickness gauge for comparing the thickness of a measured sheet of material with the thickness of a reference sheet of material, a source of microwave energy, a plurality of antennas positioned to illuminate opposite sides of said sheets with microwave energy from said source and to receive first and second measuring waves reflected from said opposite sides of said measured sheet and first and second referencing waves from said opposite sides of said reference sheet, means comparing said first waves and producing a first output wave comprising the out-of-phase components of said first waves, means comparing said second waves and producing a second output wave comprising the out-of-phase components of said second waves, means comparing said first and second output waves and producing a third output wave comprising the in-phase components of said first and second output waves, and means converting said third output wave to a signal indicating the relative thickness of said sheets.

8. In a microwave thickness gauge for comparing the thickness of a measured sheet of material and a reference sheet of material, a source of microwave energy, a plurality of antennas adapted to illuminate opposite sides of said sheets with microwave energy from said source and to receive first and second measuring waves reflected from said opposite sides of said measured sheet and first and second referencing waves from said opposite sides of said reference sheet, means comparing said first waves and producing a first output wave comprising the out-of-phase components of said first waves, means comparing said second waves and producing a second output wave comprising the out-of-phase components of said second waves, means comparing said first and second output waves and producing a third output wave comprising the in-phase components of said first and second output waves, and means combining said third output wave and a third reference wave to produce an electrical signal indicating the direction and the magnitude of the difference in thickness between said sheets.

9. A microwave thickness gauge for comparing the thickness of a measured sheet with the thickness of a reference sheet comprising a source of microwave energy, first and second pairs of antennas for illuminating opposite surfaces of said measured sheet and said reference sheet with energy from said source and receiving energy reflected from said surfaces, a first hybrid junction coupling said source to said first pair of antennas and producing a first output wave comprising the out-of-phase components of waves reflected to said first hybrid junction, a second hybrid junction coupling said source to said second pair of antennas and producing a second output wave comprising the out-of-phase components of the waves reflected to said second hybrid junction, a third hybrid junction coupled to receive said first and second output waves and to produce a third output wave comprising the in-phase components of said first and second output waves and producing an electrical signal proportional to the magnitude of said third output wave.

10. In a microwave gauge for a test sheet of microwave reflecting material: a reference sheet of microwave reflecting material having a reference thickness, a source of microwave energy, antennas for illuminating opposite surfaces of said test sheet and said reference sheet with microwave energy from said source and receiving measuring waves reflected from said test sheet and reference waves reflected from said reference sheet, a first hybrid junction for receiving one of said measuring waves and one of said referencing waves and producing a first output wave comprising the out-of-phase components of said waves and a second output wave comprising the in-phase components of said waves, a second hybrid junction for receiving another of said measuring waves and another of said referencing waves and producing a first output wave comprising the out-of-phase components of said waves and a second output wave comprising the in-phase components of said waves, means absorbing said second outputs, a third hybrid junction receiving said first outputs and producing a third output wave comprising the out-of-phase components of said first outputs and a fourth output wave comprising the in-phase components of said first outputs, means sensitive to the phase and the magnitude of said third output wave to produce a first signal indicating the distance and direction of said measured sheet from a reference position, and means sensitive to the phase and the magnitude of said fourth output to produce a second signal indicating the magnitude and direction of an error in thickness of said measured sheet with respect to said reference thickness.

11. In a microwave gauge for use with a measured sheet of microwave reflecting material: a sheet of microwave reflecting material having a reference thickness, a source of microwave energy, antennas for illuminating opposite surfaces of said measured sheet and said reference sheet with microwave energy from said source and receiving measuring waves reflected from said measured sheet and reference waves reflected from said reference sheet, a first hybrid junction for receiving one of said measuring waves and one of said referencing waves and producing a first output wave comprising the out-of-phase components of said waves, a second hybrid junction for receiving another of said measuring waves and another of said referencing waves and producing a second output wave comprising the out-of-phase components of said waves, a third hybrid junction receiving said first and second output waves and producing a third output wave comprising the out-of-phase components of said first and second outputs and means sensitive to the phase and the magnitude of said third output wave to produce a signal indicating the distance and direction of said measured sheet from a reference position.

12. In a microwave gauge for use with a sheet of microwave reflecting material: a sheet of microwave reflecting material having a reference thickness, an oscillator, antennas for illuminating opposite surfaces of said measured sheet and said reference sheet with microwave energy from said source and receiving measuring waves reflected from said measured sheet and reference waves reflected from said reference sheet, a first hybrid junction for receiving one of said measuring waves and one of said referencing waves and producing a first output wave comprising the out-of-phase components of said waves, a second hybrid junction for receiving another of said measuring waves and another of said referencing waves and producing a second output wave comprising the out-of-phase components of said waves, a third hybrid junction receiving said first and second outputs and producing a third output wave comprising the in-phase components of said first and second outputs and means sensitive to the phase and the magnitude of said third output to produce a signal indicating the magnitude and direction of an error in thickness of said measured sheet with respect to said reference thickness.

13. A microwave thickness gauge for an automatic gauge control for a mill or for a similar application in which the measured material should conform during successive steps in processing to a succession of differing reference thicknesses, a source of microwave energy, first and second measuring antennas cooperating with said source to illuminate two surfaces of said material with microwave energy and to receive energy reflected from said surfaces, a plurality of sheets of microwave reflecting material each having a reference thickness, first and second referencing antennas cooperating with said source to illuminate two surfaces of a selected one of said reference sheets with microwave energy and to receive energy reflected from said surfaces, first and second hybrid junctions defining reference points in said gauge with respect to said surfaces and each receiving corresponding reference waves and producing output waves indicating variations in the distance between said reference points and the corresponding surfaces of said sheet, and means combining said distance indicating outputs and separating components of a change in said outputs which are equal in distance and opposite in direction and components of a change in said outputs which are equal in distance and in the same direction, and means for converting at least one of said components to a signal indicating the difference between the thickness of said measured material and said reference.

14. In a microwave gauge: first and second antennas positioned to each receive a measuring wave reflected from first and second surfaces of a measured subject, first means comparing said measuring waves with first and second reference waves and producing a first output wave indicating the position of said first surface with respect to said first comparing means and producing a second output wave indicating the position of said second surface with respect to said first comparing means, second means comparing said first and second output waves and separating components that contain information about the distance between said first and second surfaces from components that contain information about the position of said subject, a hybrid T, means supplying a third reference wave to the E-plane arm of said hybrid T, means supplying said components containing information about the distance between said first and second surfaces to the H-plane arm of said hybrid T, means producing electrical signals indicating the magnitude of the resultant waves in each of the colinear arms of said hybrid T, and means indicating the magnitude and the polarity of the difference between said electrical signals.

15. A microwave thickness gauge for comparing the thickness of a measured sheet with the thickness of a reference sheet comprising a source of microwave energy, first and second pairs of antennas positioned for radiating energy from said source to first and second surfaces of said measured sheet and said reference sheet and for receiving energy reflected from said surfaces, a first hybrid junction coupling said source to said first pair of antennas and producing an output wave comprising the out-of-phase components of waves reflected from said first surfaces, a second hybrid junction coupling said source to said second pair of antennas and producing an output wave comprising the out-of-phase components of the waves reflected from said second surfaces, a third hybrid junction coupled to said first and second hybrid junctions and producing a third output comprising the in-phase components of said first and second output waves, a fourth hybrid junction coupled to said source and to the output of said third hybrid junction to combine said third output with a first reference wave in one arm of said fourth hybrid junction and with a second reference wave in another arm of said fourth hybrid junction, said first and second reference waves being 180 degrees out of phase in said arms, means producing first and second voltage signals indicating the resultants of the waves in said arms, and means responsive to the magnitude of the difference between said first and second voltage signals to indicate the error in thickness of said measured sheet and responsive to the polarity of said difference to indicate the direction of said error.

References Cited in the file of this patent
UNITED STATES PATENTS
2,640,190    Rines _____ May 26, 1953